May 18, 1943.   H. W. GROTE   2,319,500
MANUFACTURE OF LOW BOILING PETROLEUM DISTILLATES
Filed April 18, 1940
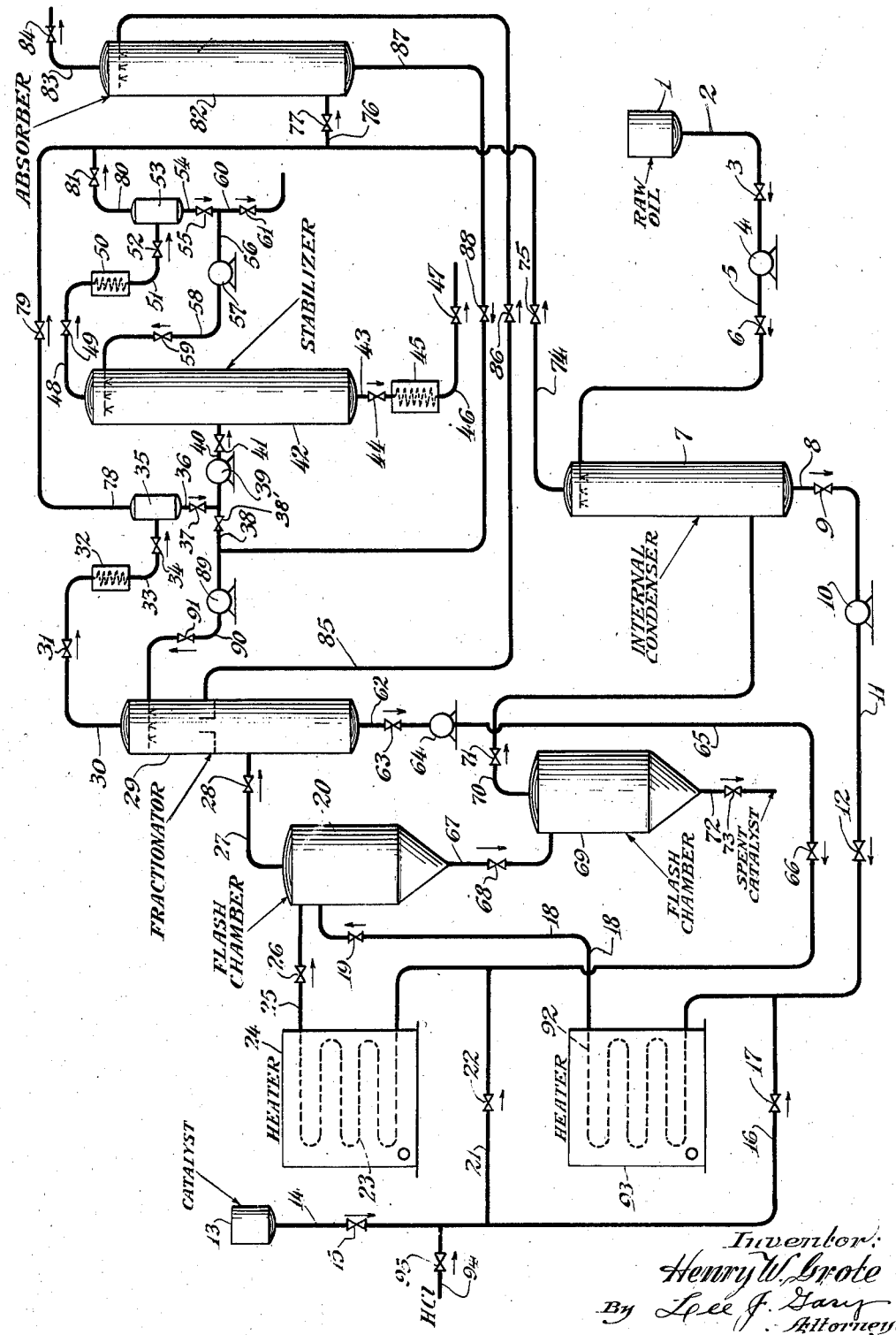

Patented May 18, 1943

2,319,500

UNITED STATES PATENT OFFICE 2,319,500

MANUFACTURE OF LOW BOILING PETROLEUM DISTILLATES

Henry W. Grote, Chicago, Ill., assignor to Universal Oil Products Company, Chicago, Ill., a corporation of Delaware Application April 18, 1940, Serial No. 330,253

4 Claims. (Cl. 196—54)

This invention relates to the manufacture of low boiling petroleum distillates comprising a process of catalytically cracking higher boiling petroleum fractions in the presence of anhydrous aluminum chloride. This process is advantageously applied to a hydrocarbon distillate such as a gas oil, although it is not the purpose of the invention to be limited to such a charging stock.

As is well known, anhydrous aluminum chloride exerts several specific effects upon heated mineral oils. These effects include the severing of carbon-to-carbon bonds, resulting in a decyclization of naphthenes and isomerization of straight chain paraffins into compounds with iso structure, the net result of which is to form low boiling distillates which have the advantage of being saturated and at the same time having relatively high octane numbers. The process is well suited for the production of saturated aviation fuels of good tetraethyl lead susceptibility, producing at the same time a gas consisting in large part of isobutane.

In general the best results are obtained by employing such contact time as that which will give conversion of 10 to 25% by weight of gas plus gasoline per pass in the presence of 1½ to 2% by weight of aluminum chloride based on the combined feed. It has been found advantageous to add a small quantity of anhydrous hydrogen chloride with the charge. The present invention comprises a continuous process of aluminum chloride cracking in which the catalyst is supplied in the form of a slurry and commingled with the feed for the heating coil. The process includes two flash chambers, the used catalyst being removed in slurry form with a non-vaporous residue from the secondary flash chamber. A certain amount of anhydrous aluminum chloride, as well as its hydrocarbon complexes, are carried along in the vapors from the two flash chambers. This aluminum chloride has retained most of its activity and, according to the process of my invention, is returned in the form of a slurry to the cracking zone. In one specific embodiment the present invention comprises subjecting a combined feed formed as hereinafter described to the action of aluminum chloride catalyst in a primary cracking zone under such conditions as to form substantial quantities of gasoline, flashing the products of said catalytic treatment jointly with the products from a second aluminum chloride cracking zone operating in a manner to be subsequently described, directing the vapors from said flashing process to fractionating process for separation of gasoline and light products and a side cut to be used as an absorbing oil as will be further described, and a residual fraction, subjecting said residual fraction to a catalytic cracking treatment with powdered aluminum chloride in a secondary cracking zone, directing the conversion products from said secondary cracking zone to the primary flash chamber for joint flashing with the products from the primary cracking zone as already described, directing the residual product from the primary flashing zone to a secondary flashing zone for further vaporization and for separation from the used catalyst, directing the vapors evolved in said secondary flashing zone to a zone for cooling and condensation by commingling with the raw oil charging stock to form a combined feed for cracking by aluminum chloride in a primary cracking zone as already described, separating the unstabilized gasoline and gaseous products obtained as an overhead product in the fractionator from the vapors from the primary flash chamber, stabilizing said gasoline to form a motor fuel of the desired vapor pressure and a lighter fraction, separating from said lighter products a liquid fraction rich in isobutane, combining the remaining portion of said light products with the gases separated in the receiver for the unstabilized gasoline and directing said gaseous mixture with any vapors evolved in the internal condenser and cooler for the vaporous product from the secondary flash chamber and subjecting the total cracked gaseous mixture to contact with an absorbing oil obtained in a side cut from the fractionator for the vaporous products of the primary flash chamber, returning the rich absorber oil to said fractionator for the liberation of the cracked product.

These and other features of the present invention can be more readily described by referring to the accompanying drawing which represents diagrammatically various steps of the processes involved and the general nature of the equipment used to carry out the operations described. Raw oil for the process is removed from storage chamber 1 by way of line 2 containing control valve 3 and by means of pump 4 is directed to line 5, valve 6 from which it passes into fractionator 7. This fractionator operates as an internal cooler and condenser for the vapors obtained from the secondary flashing chamber, the major portion of the vapors from said flash chamber being condensed in column 7 giving up their heat to the incoming raw oil charging stock. The combined heated raw oil and condensed vapors from this secondary flash chamber are removed from the column by way of line 8, valve 9 and by means of pump 10 are introduced through line 11, valve 12 after which they are commingled with the aluminum chloride catalyst which is supplied in slurry form from container 13 by way of line 14, valve 15 through line 16, valve 17. The feed for the heating coil together with the catalyst is raised to a temperature within the approximate range of 500 to 850° F. under a pressure of 70–400 pounds per square inch. The heated oil is discharged from coil 92 through line 18 and after passing through valve 19 enters flash chamber 20 under a substantially reduced pressure of approximately 30–100 pounds per square inch. Flash chamber 20 operates for the joint flashing of the product from heater 92 as already described and for the product of heater 23, the operation of which will be discussed subsequently. The vaporous conversion products, together with the vapors from flash chamber 20 are removed by way of line 27, valve 28 and directed to fractionating column 29. Fractionating column 29 operates at substantially the same pressure as flesh chamber 20, a light vaporous fraction consisting of normally gaseous products and gasoline boiling range hydrocarbons being removed as an overhead product through line 30, valve 31 and directed to cooler and condenser 32 wherein the normally liquid hydrocarbons are condensed to form a distillate. The distillate together with the undissolved and uncondensed gases leaving condenser 32 are directed through line 33, valve 34 to receiver 35 wherein the distillate gases are collected and separated. The distillate collected and separated in receiver 35 is removed by way of line 36, valve 37 and directed to line 38 from which a portion is returned to fractionator 29 for refluxing and cooling the upper portion thereof as will be further described. A portion of the distillate not so returned is directed by means of pump 39 to line 40, valve 41 from which it is supplied to stabilizer 42. Stabilizing column 42, which may operate under a pressure of 100–300 pounds per square inch, produces a gasoline of the desired vapor pressure which is removed from the column as a bottoms product through line 43, valve 44 and is directed to cooler 45 from which it passes through line 46, valve 47 and is collected as a product of the process. The overhead from stabilizer 42 consists of normally gaseous hydrocarbons and is directed through line 48, valve 49 to cooler and condenser 50 which operates to cool and condense the greater portion of said overhead product. Distillate leaving condenser 50 together with the undissolved and uncondensed gases is directed through line 51, valve 52 to receiver 53 wherein the undissolved and uncondensed gases are separated from the distillate. The distillate collected in the lower portion of receiver 53 is removed by way of line 54, valve 55 and a portion directed to line 56 where by means of pump 57 it is directed to line 58, valve 59 to stabilizer 42 for cooling and reflux. The portion of the distillate not so returned is directed through line 60, valve 61 and is collected as a product of the process. It contains a large quantity of isoparaffins, particularly isobutane, and may constitute a valuable stock for such processes as alkylation or dehydrogenation to form aviation fuel.

The bottoms product obtained in fractionator 29 is removed by way of line 62, valve 63 and by means of pump 64 is directed to line 65, valve 66, after which it is commingled with powdered aluminum chloride catalyst supplied in a slurry through line 21, valve 22 and directed to heating coil 23 so disposed as to receive heat from furnace 24. Heating coil 23 operates under a pressure varying from 70 to 400 pounds per square inch. The charge leaves the heating coil at a temperature within the range of approximately 650–900° F. and is directed by way of line 25, valve 26 to primary flash chamber 20, operating at a pressure within the approximate range of 30–100 pounds per square inch, wherein it is flashed jointly with the conversion products obtained from the primary heating coil 92 as previously described. The liquid residue obtained from flash chamber 20 containing the used catalyst in suspension is removed by way of line 67, valve 68 and is directed to a secondary flash chamber 69 operating under a pressure varying from 5 to 50 pounds per square inch. The vapors formed in flash chamber 69 are removed by way of line 70, valve 71 and are directed to column 7 where they are cooled and condensed by being commingled with the raw oil charging stock as previously described. The non-vaporous liquid residue obtained in flash chamber 69 containing spent catalyst in suspension is removed by way of line 72, valve 73. It may be regenerated by the action of air and chlorine, or by other methods well known in the art.

A small quantity of non-condensible gases not absorbed in fractionator 7 is removed by way of line 74, valve 75 and directed to line 76 wherein it is commingled with the gases removed from separator 35 by way of line 78, valve 79 and the stabilizer gases removed from receiver 53 by way of line 80, valve 81. The combined gases go through valve 77 and pass into absorber 82 where they are subjected to contact with an absorbing liquid obtained as a side cut from fractionating column 29 from which it is removed by way of line 85, valve 86. The hydrogen and normally gaseous hydrocarbons in excess of that necessary to gases of desired vapor pressure is removed by way of line 83, valve 84 and collected as a product of the process. The liquid absorbing medium used in column 82 containing lighter hydrocarbons in solution is removed by way of line 87 and after passing through valve 88 is directed to line 38 commingling therein with a portion of the distillate removed from receiver 35 by way of line 36, valve 37, line 38 and valve 38'. The resultant mixture is forced by pump 89 through line 90 and valve 91 into fractionating column 29 for cooling and reflux and for the liberation of the more volatile constituents.

The following example is given to illustrate the usefulness and practicability of my process but should not be construed as limiting it to the exact conditions indicated therein. A Trinidad gas oil is charged to the internal condenser and commingled with the vapors from the secondary flash chamber. This combined feed is subjected to cracking with 2% by weight of powdered aluminum chloride catalyst in the primary cracking zone at a temperature of 650° F. and a pressure of 200 pounds per square inch. The converted products of the primary reaction coil are flashed jointly with the products from the secondary reaction coil in a primary flash chamber operated under a pressure of 100 pounds per square inch. The vapors from the primary flash chamber are directed to a fractionating column operated under substantially the same pressure for the separation of gasoline boiling range hydrocarbons and lighter products, a side cut which is used as an absorbing oil and returned to the column and a residual liquid portion which is commingled with 2% by weight of the aluminum chloride in the form of a slurry and directed to a secondary cracking zone operated at a temperature of 750° F. and a pressure of 200 pounds per square inch. The products from this secondary cracking zone are flashed as already described. The residual portion obtained from the primary flash chamber is directed to a secondary flash chamber for further vaporization. This secondary flash chamber is operated under a pressure of 30 pounds per square inch, vapors formed in the flashing operation being separated from the liquid residue containing the used catalyst in suspension. Vapors from the secondary flash chamber are cooled and condensed by commingling with the raw oil as already described. A yield of gasoline equal to 41% by volume of 300 end point, having an octane number of 76½ may be obtained. A total yield of 24% of butane containing 88% isobutane may be obtained from the same operation.

I claim as my invention:

1. A process for converting hydrocarbon oils into valuable products including high antiknock gasoline which comprises subjecting a combined feed formed as hereinafter described to the action of powdered aluminum chloride catalyst in a primary cracking zone under conditions of temperature and pressure adequate to produce substantial yields of motor fuel, supplying the reaction products to a primary flashing zone for joint flashing with reaction products obtained in a manner hereinafter described, directing vapors from said primary flashing zone to a fractionating step for separation into normally gaseous products, gasoline boiling range hydrocarbons and higher boiling intermediate conversion products, subjecting at least a portion of said intermediate conversion products to the action of powdered aluminum chloride in a secondary cracking zone, commingling the products from said secondary cracking zone with the products from said primary cracking zone for joint flashing as aforesaid, withdrawing non-vaporous products containing aluminum chloride from the primary flashing zone to a secondary flashing zone for further vaporization, scrubbing the vapors containing aluminum chloride from said secondary flashing zone with raw oil charging stock to form said combined feed for the primary cracking zone as previously described and to condense the aluminum chloride in said vapors.

2. The process as set forth in claim 1 wherein the primary cracking zone is operated at a temperature within the range of approximately 500–850° F. and a pressure within the range of approximately 70–400 pounds per square inch.

3. The process as set forth in claim 1 wherein the secondary cracking zone is operated at a temperature within the range of approximately 650–900° F. and a pressure within the range of 70–400 pounds per square inch.

4. A conversion process which comprises passing a mixture of hydrocarbon oil and aluminum chloride catalyst in a restricted stream through a heating zone and subjecting the same therein to catalytic conversion conditions of temperature and pressure, discharging resultant products into an enlarged separating zone and therein separating vapors from residual catalyst-containing liquid, fractionating the vapors to condense heavier fractions thereof, passing resultant reflux condensate, together with additional aluminum chloride catalyst, through a second heating zone and therein subjecting the same to independently controlled catalytic conversion conditions, discharging reaction products and catalyst from said second zone into said separating zone for separation therein together with the first-mentioned products, removing said catalyst-containing liquid from the separating zone and reducing the pressure thereon, thereby forming additional vapors containing aluminum chloride, contacting said additional vapors with fresh charging oil for the process to condense at least a portion thereof and the aluminum chloride, and supplying thus commingled charging oil, condensate and aluminum chloride to the first-mentioned heating zone.

HENRY W. GROTE.